No. 840,782. PATENTED JAN. 8, 1907.
T. J. LINDSAY.
STEERING SPINDLE.
APPLICATION FILED APR. 9, 1906.
2 SHEETS—SHEET 1.
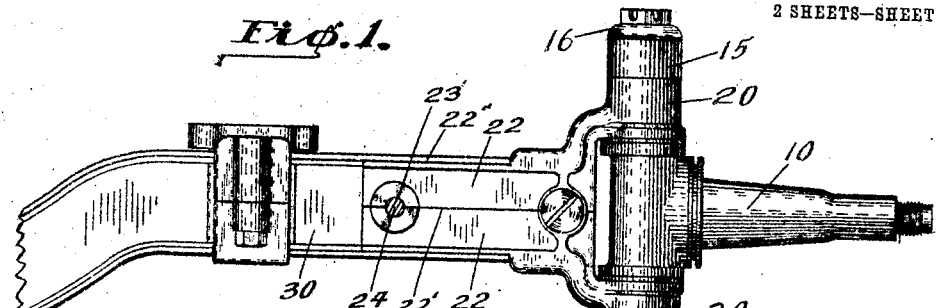
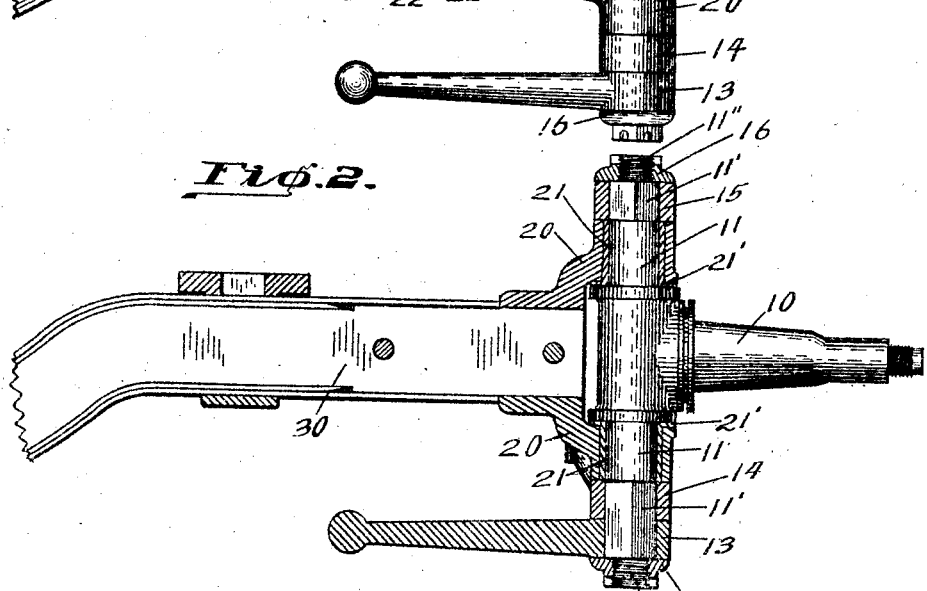
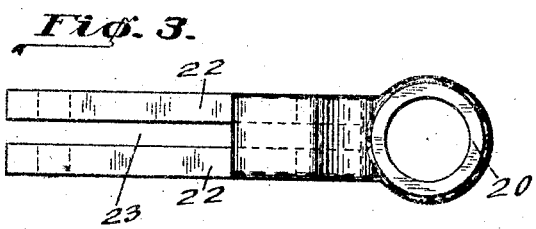
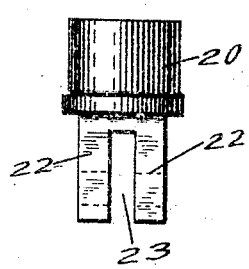
Witnesses
Vernon Plummer
Thomas W. McMeans
Inventor
Thomas J. Lindsay
By Bradford Hood
Attorneys No. 840,782. PATENTED JAN. 8, 1907.
T. J. LINDSAY.
STEERING SPINDLE.
APPLICATION FILED APR. 9, 1906.

2 SHEETS—SHEET 2.

Witnesses
Vernon Plummer
Thomas W. McMeans

Inventor
Thomas J. Lindsay
By Bradford Hood
Attorneys.

UNITED STATES PATENT OFFICE.

THOMAS J. LINDSAY, OF INDIANAPOLIS, INDIANA.

STEERING-SPINDLE.

No. 840,782.    Specification of Letters Patent.    Patented Jan. 8, 1907.

Application filed April 9, 1906. Serial No. 310,728.

*To all whom it may concern:*

Be it known that I, THOMAS J. LINDSAY, a citizen of the United States, residing at Indianapolis, in the county of Marion and State of Indiana, have invented certain new and useful Improvements in Steering-Spindles, of which the following is a specification.

The object of my invention is to provide a two-part pivotal support for a steering-wheel spindle, the construction being such that said two parts may be readily and conveniently machined and fitted for attachment to the ends of an axle structure formed preferably of an I-beam, and the construction also being such that said two-part support may be secured in position with a minimum number of fastenings, the two parts of the support being preferably identical.

The accompanying drawings illustrate my invention.

Figure 6:
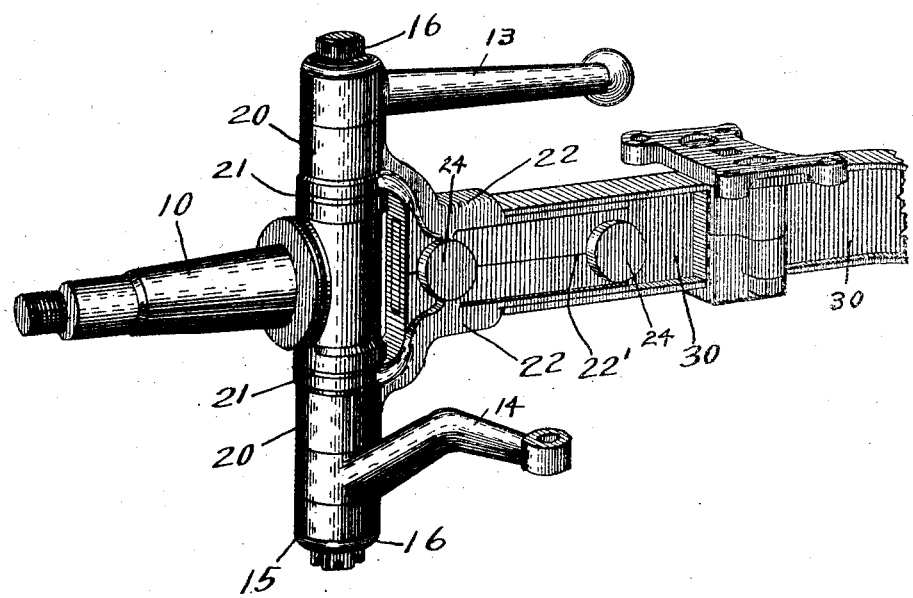
Figure 7:
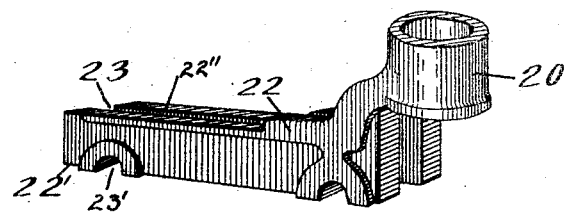

Figure 1 is a side elevation of an embodiment thereof; Fig. 2, a similar view with the spindle-supports in vertical section; Fig. 3, a plan of one of the spindle-supports; Fig. 4, an end elevation of the structure shown in Fig. 3; Fig. 5, a perspective view of the end of an I-beam axle formed to receive my improved spindle-support; Fig. 6, a perspective view of the completed structure, and Fig. 7 a perspective view of one of the spindle-supporting members.

In the drawings, 10 indicates the steering-wheel spindle provided at one end with a pair of oppositely-extending journals 11 11, which are preferably integral with the spindle structure, and each terminating in a polygonal portion 11' and a threaded end 11". One of the portions 11' is preferably double the length of the other in order that it may receive both of the arms 13 and 14, as shown in Figs. 1 and 2, or said arms may be attached to the spindle structure at its opposite ends, as shown in Fig. 6. A collar 15 is provided as a necessary filling-piece to be applied to the shorter polygonal portion 11' when the arms 13 and 14 are applied, as shown in Figs. 1 and 2, or applied to the longer polygonal portion 11' when the arms 13 and 14 are assembled, as shown in Fig. 6. A nut 16 is provided for each of the threaded ends 11'. Each journal 11 is received in a bearing 20, which is preferably provided with a bushing 21, having a headed inner end 21' for a purpose which will appear.

In the drawings the bearings 20 are identical and are carried by identical structures, and I shall therefore confine my description to such an identical structure, although it will be readily understood that there may be variations of proportions in the two parts without avoiding the spirit of my invention. Each bearing 20 is carried at the upper outer corner of a bar 22, which is slitted longitudinally, as at 23, and each bar 22 is provided in its inner edge with one or more transverse grooves 23', the arrangement being such that said transverse grooves of the two bars 22 will register to form bolt-openings, each adapted to receive a bolt or other transverse fastening member 24. The bars 22 are machined accurately along their inner edges 22' and their outer edges 22". When the structure is to be applied to an I-beam axle 30, the I-beam is suitably milled out between its flanges 30' on each side, as at 31, so that the combined arms 22 may fit snugly between the upper and lower flanges 30'. The upper and lower flanges 30' are then stripped away from the web of the I-beam at the ends so as to form a projecting tongue 30", adapted to fit snugly in the two slits 23 of the arms 22. Perforations 32 are then formed through the web of the I-beam 30 in position to register with the grooves 23, so as to receive the transverse fastenings 24.

The structure just described is exceedingly simple to manufacture. The member 20 22 will be made preferably as a drop-forging, and the bearing 20 will be first fitted to receive the bushing 21. The part will then be jigged from this opening and a milling-cutter run lengthwise through the arm 22 to form the slit 23. At the same time, if desired, the inner edge 22' of the arm 22 may be faced. Two members may then be clamped together upon their mating faces 22', and the inner ends of the arms 22 run between a pair of milling-cutters, so as to form the surfaces 22" and properly dimension the completed structure. A proper milling-cutter may be run between the flanges 30' of the I-beam transversely between suitable milling-cutters to strip off the ends of the flanges 30'. In order to assemble parts, the bushings 21 will first be introduced at the inner or adjacent ends of the bearings 20 and the bearing structures 20 22 then placed upon the journals 11 of the spindle structure. The inner ends of the arms 22 are then inserted between the overhanging flanges of the ends of the I-beam 30, the projecting tongue 30" of the web passing into the slits 23 of the arms 22. The fastening-bolts 24 are then readily passed through the registering openings 23 and 32. By this arrangement all of the parts are held into position by the fasteners 24, and the bushings 21 are automatically held in position by the steering-spindle structure.

The I-beam 30 may readily be of standard form, and it will be seen that it may be bent into any desired form, the steering-spindle supports being readily attached to its ends after it has been bent to desired shape.

I claim as my invention—

1. The combination, with an axle structure comprising a medial web and overhanging flanges, of a steering-spindle support comprising a journal for the steering-spindle, and a main body, the inner end of which is longitudinally slitted to receive the medial web of the axle, and is fitted between the overhanging flanges, and means for fastening the spindle-support member to the axle structure to prevent longitudinal withdrawal.

2. The combination, with an axle structure comprising a medial web and overhanging flanges, of a steering-spindle support comprising a member carrying at its outer end a steering-spindle journal and at its inner end fitted to lie between the overhanging flanges of the axle structure, and means for attaching said member to the axle structure to prevent longitudinal withdrawal.

3. The combination, with an axle structure comprising a medial web and overhanging flanges, of a steering-spindle support comprising a pair of members each consisting of an arm and a steering-spindle journal, each of said arms being slitted to receive the medial web of the axle structure, and being fitted at its inner end to lie between the overhanging flanges of the axle structure, and means for holding said members in position upon the axle structure against longitudinal displacement.

4. The combination, with an axle structure comprising a medial web and overhanging flanges, of a steering-spindle support comprising a pair of members each consisting of an arm and a steering-spindle journal, each of said arms being slitted to receive the medial web of the axle structure, and being fitted at its inner end to lie between the overhanging flanges of the axle structure, and each provided in that face which mates with the other member with a transverse groove, and a fastening member passing through the axle member and lying in the registering transverse grooves of the spindle-supporting members.

In witness whereof I have hereunto set my hand and seal, at Indianapolis, Indiana, this 31st day of March, A. D. 1906.

THOMAS J. LINDSAY. [L. S.]

Witnesses:
ARTHUR M. HOOD,
THOMAS W. MCMEANS.